United States Patent [19]

Ellis

[11] 4,454,795
[45] Jun. 19, 1984

[54] BAND SAW
[76] Inventor: Wayne S. Ellis, 401 S. Marietta, Verona, Wis. 53593
[21] Appl. No.: 410,935
[22] Filed: Aug. 24, 1982
[51] Int. Cl.³ .................. B23D 53/06; B23D 55/08
[52] U.S. Cl. ....................................... 83/820; 83/796; 83/797; 83/799; 83/800
[58] Field of Search ................ 83/820, 796, 799, 800, 83/801, 797

[56] References Cited
U.S. PATENT DOCUMENTS

| 380,857 | 4/1888 | Bryant | 83/796 |
| 2,556,670 | 6/1951 | Ashworth | 83/796 X |
| 3,830,131 | 8/1974 | Wells | 83/820 |
| 3,875,839 | 4/1975 | Aizawa | 83/800 X |
| 4,127,045 | 11/1978 | Blucher et al. | 83/796 |
| 4,364,294 | 12/1982 | Eccardt | 83/796 |

Primary Examiner—Donald R. Schran
Attorney, Agent, or Firm—Keith Schoff

[57] ABSTRACT

A metal cutting band saw equipped with blade twisting guides and pivotal, scissors-like mounting which enables the saw to be used as a cut-off or mitering tool, is configured to provide for maximum depth of cut by locating the blade guide mounting bar in a position which does not restrict clearance distance to less than the separation distance between the blade runs.

5 Claims, 2 Drawing Figures

BAND SAW

BACKGROUND OF THE INVENTION

Metal cutting band saws are conveniently mounted with the axes of the blade pulleys tilted at an angle to the cutting plane of the blade by providing one leg of the run of the blade with blade guides which twist the blade, the advantage being that the assembly can be pivotally mounted in scissors-like arrangement with respect to a horizontal work table for use as a cut-off tool or miter cutting saw. The capacity of the saw for cutting large work pieces is limited by the clearance between the cutting edge of the blade and any superjacent obstruction, the limiting clearance being the vertical separation between the two runs of the blade.

SUMMARY OF THE DISCLOSURE

The greatest possible depth of cut capability is provided to a two-pulley scissors mounted band saw by locating the rail which mounts the adjustably set blade guides in a position which does not interfere with the clearance between runs of the blade, the blade guides being configured to twist the blade ninety degrees from its orientation tangent to the face of the pulleys.

DESCRIPTION OF THE INVENTION

Figure 1:
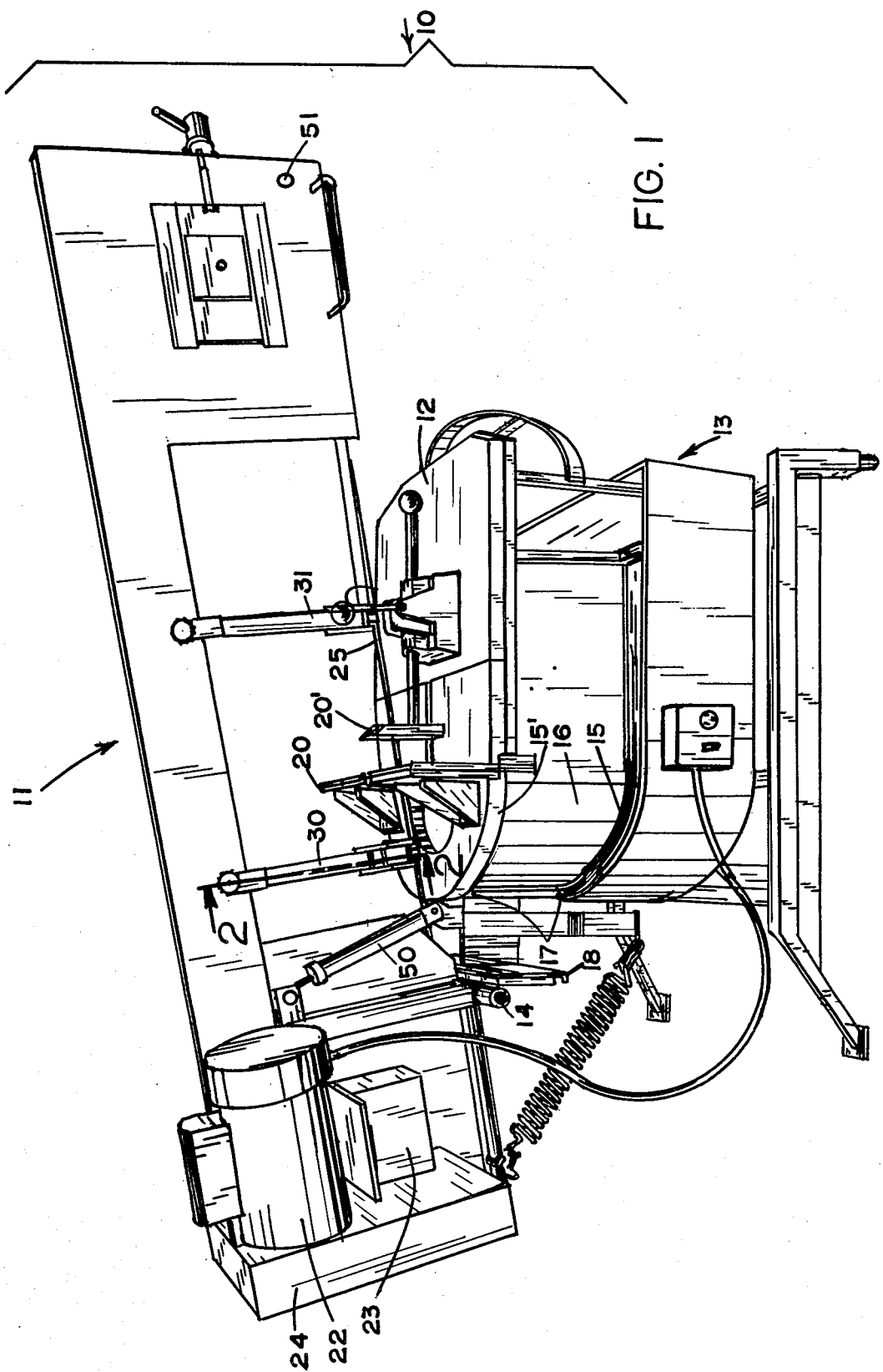
FIG. 1 is a perspective view of an embodiment of a metal cutting band saw and work table assembly of this invention suitable for being used as a mitering and cut-off tool.

Referring to FIG. 1, band saw tool 10 is shown comprising saw frame portion 11 pivotally mounted for scissors-like biasing with respect to work table 12 of base standard portion 13, portions 11 and 13 being connected by hinge 14. Additionally, saw frame portion 13 together with hinge 14 are mounted to be pivotally rotatable about a vertical axis which is coincident with that of semi-cylindrical casting 9, the latter being provided with upper and lower peripheral guideways 15, 15' in which cam-like rollers 17 are operably engaged, the rollers being carried by the structure mounting hinge 14. Saw frame portion 11 is thus enabled to be manually rotated to selected angular positions with reference to the compass of the surface of work table 12 for making angular, or miter, cuts in a work piece clamped in place by jaw members 20, 20' of a work table secured vise, jaw member 20 being fixed in position coincident with the axis of rotation of saw frame portion 11 and associated structure, and jaw member 20' being manually biasable with respect to jaw member 20.

Thus mounted, saw frame portion 11 is biasable vertically in scissors-like manner above work table 12 and is also rotatable through angular traverse with respect to the plane of the surface of the work table. Means are provided for securing frame portion 11 in place at a desired angular setting for making miter cuts in workpieces placed on work table 12.

Electric motor 22 provided with reduction gear box 23 and adjustable power transmission belt 24 together with operable mechanical connection powers blade drive pulley, obsured from view, on which endless cutting blade 25 is mounted: a companion blade mounting idler pulley, also obscured from view, is provided at the opposite end of saw frame portion 11, with blade tensioning means being provided.

Blade guides 30, 31 are each provided with a set of three ball bearing mounted rollers 40, 40', and 41 disposed to provide roller contact with each side face of the lower run of blade 25 and with the non-cutting edge of the blade. Blade 25 is thus constrained to a closely controlled linear path lower run as it passes a workpiece clamped in vise jaw members 20, 20'. The blade guides twist blade 25 ninety degrees from a plane of blade tangency with the blade drive and idler pulleys to a vertical cutting plane as the blade traverses a workpiece on work table 12. At least blade guide 30, and preferably both blade guides are manually adjustable to provide for variable spacing between the guides.

It is possible in well known manner, but not preferred, to mount saw frame portion 11 at an angle other than perpendicular to the surface of work table 12 and to provide blade guides which twist the cutting blade through an angle less than ninety degrees to achieve vertical cutting orientation. A disadvantage of so doing is that the depth to which a cut can be made in a workpiece is decreased relative to that which can be made with a saw frame portion of the same size and configuration set in a plane perpendicular to the worktable. The foregoing description comprises no part of this invention.

Figure 2:
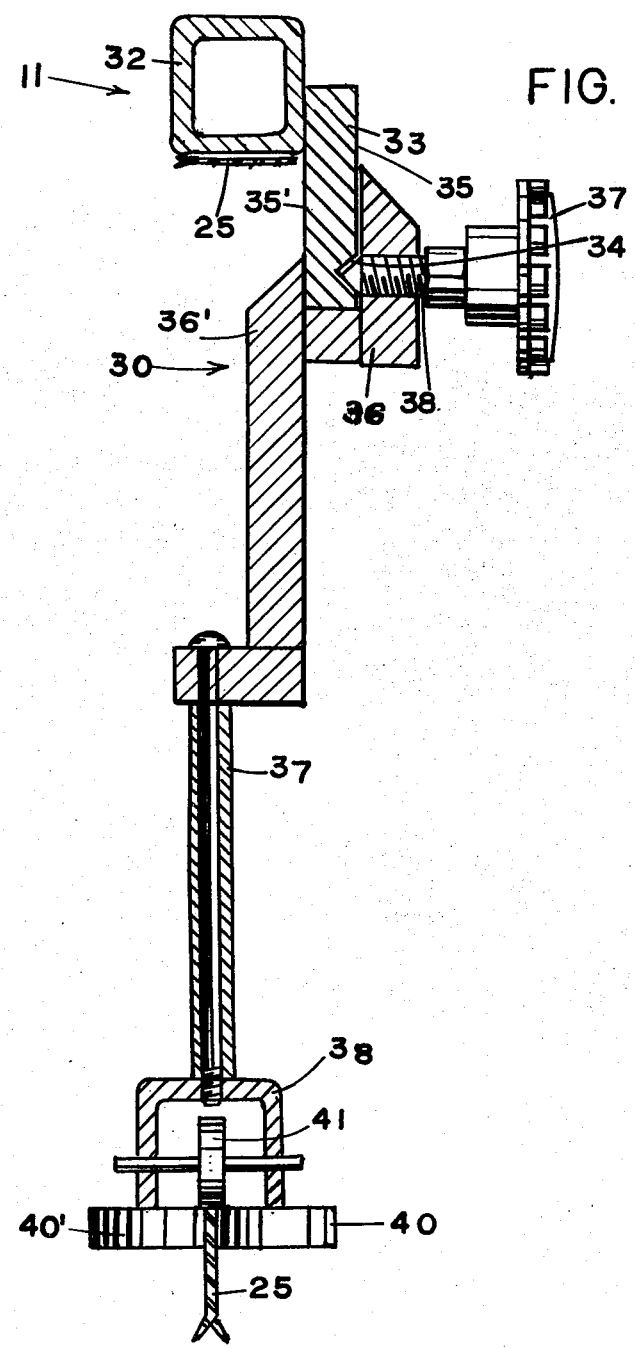
FIG. 2 is a cross sectional elevation of a portion of the embodiment of FIG. 1.

In FIG. 2 saw frame portion 11 is shown in cross section to comprise square tubing 32 extending longitudinally as the main structural member providing rigidity to portion 11. Guide member mounting bar 33 is fixed to tubing 32, preferably welded, and is configured with "V" groove 34 extending along the length of lateral face 35.

Blade guide 30 is configured with a yoke shaped upper extremity with leg 36, 36' disposed closely adjacent lateral faces 35, 35' of bar 33. Threaded stud 38 equipped with knob handle 37 is provided with a conical tip enabling the stud to be tightened into groove 34 to firmly secure the blade guide in place on bar 33.

Depending leg portion 37 of guide 30 is offset from the upper extremity yoke configured portion to a position directly intermediate the two runs of blade 25 with the lower extremity of the leg affixed to channel configured roller bearing mounting member 38 on which rollers 40, 40' are mounted operably to rotate on axes disposed in parallel planes and perpendicular to the run of blade 25 between guides 30, 31, and on which roller 41 is mounted to rotate about a horizontal axis. The rollers respectively contact the two side faces and the non-cutting edge of blade 25 to firmly restrain blade movement to a relatively invariable linear path to provide accurate and precise cutting of a workpiece. Blade guides 30, 31 serve also to twist the lower run of blade 25 ninety degrees into coplanar alignment with the plane of rotation of the blade drive and idler pulleys from orientation in the plane of surface tangency with the peripheral surface of the pulleys. Accordingly, the upper run of blade 25 is disposed vertically superjacent with respect to the lower run of the blade and with blade guides 30, 31 extending through a lateral offset to a parallel, non-coincident planar location of bar 33 with respect to the blade pulleys. The upper run of blade 25 is disposed closely adjacent below the face of tubing 32 for providing virtually the manimum possible depth of cut possible with a two pulley band saw of given pulley diameters. Similarly, guide member mounting bar 33 depends virtually only to the elevation of the lower face of tubing 32 to enable a saw of given dimension to provide the maximum capability for depth of cut. Whereas, bar 33 is shown depending below the bottom level of tubing 32 slightly to enable attachment of blade guide 30 to made thereon, it is also possible to provide a slot between the lower portion of bar 33 and tubing 32 to receive the leg of the upper extremity yoke of blade guide 30 and thus dispose bar 33 entirely above the elevation of the bottom face of tubing 32. The provision of a guide member mounting bar at a spacing from the cutting run of a band saw blade not substantially less than the spacing between the cutting run of the blade and the return run is essential to provide a saw with the maximum capability for providing the greatest depth of cut commensurate with the size and configuration of the saw, and accordingly providing a saw with the greatest flexibility for use in accurately cutting objects through a range of sizes.

A preferred feature of saw 10 of this invention is manually adjustable valve 50 which controls the rate at which saw frame portion 11 closes toward base standard portion 13 by gravity actuation, the valve being provided in hydraulic fluid passage past piston means in hydraulic cylinder means operably provided with one member fastened to saw frame portion 11 and the other to base standard portion 13. For convenience of an operator of tool 10 a second valve 51 is provided in series connection with valve 50 located near a saw operator's work station at the end of saw frame member 13 opposite from hinge 14 for enabling the operator to close or open the passage of hydraulic fluid and thus stop the flow of fluid and fix the position of saw frame portion 11 above a workpiece while the operators is manipulating the workpiece for cutting. Upon opening valve 51 saw frame poriton 11 closes toward work table 12 either by gravity or manual actuation.

I claim:

1. A band saw configured with a frame embodying an elongated rigid member extending substantially tangentially between blade mounting pulleys which are carried by said frame wherein the return run of blade between pulleys is disposed in near adjacency to said elongated member and the cutting run of blade is disposed distant from said elongated member, said band saw further configured with blade guides mounted for being adjustably spaced one from the other and disposed to twist and return twist said blade during said cutting run by rotating and re-rotating the plane of said blade through ninety degree angular rotations from a vertical plane, an improvement comprising providing substantially unobstructed clearance between said cutting run and said return run of said blade intermediate said blade guides by said blade guides being mounted laterally offset on said elongated rigid member thereby to provide vertical cutting depth clearance not substantially less than the diameter of said blade mounting pulleys wherein said elongated rigid member is configured with a longitudinally extending "v" configured cross-sectional groove and said blade guides are provided with mounting arms which depend from attachment on said rigid elongated member, the upper extremities of said mounting arms being configured as yokes for being received about a portion of said elongated rigid member, each said yoke being provided with threaded clamp means having a substantially conically conifgured end extremity for engaging said "v" configured cross-sectional groove with apexes of said end extremity configurations being aligned downwardly offset from the apex of said "v" configured cross-sectional groove thereby enabling said blade guide mounting arms to be drawn into firm lateral and elevational contact with said elongated rigid member to insure precise and rigid positioning and alignment of said blade guides.

2. The apparatus of claim 1 wherein said frame is pivotally mounted near one end extremity to be rotatable about a horizontal axis.

3. The apparatus of claim 1 wherein said blade guides are adjustably mounted.

4. The apparatus of claim 1 wherein a mounting bar is provided affixed to said elongated rigid member for mounting said blade guides.

5. The apparatus of claim 2 wherein said pivotally mounted frame is further mounted to be rotatable about a vertical axis.

* * * * *